(12) United States Patent  (10) Patent No.: US 7,545,854 B1
Gronemeyer  (45) Date of Patent: Jun. 9, 2009

(54) DOPPLER CORRECTED SPREAD SPECTRUM MATCHED FILTER

(75) Inventor: Steven A. Gronemeyer, Cedar Rapids, IA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 09/498,893

(22) Filed: Feb. 7, 2000

Related U.S. Application Data

(63) Continuation-in-part of application No. 09/145,055, filed on Sep. 1, 1998, now Pat. No. 6,044,105.

(51) Int. Cl.
 *H04B 1/00* (2006.01)

(52) U.S. Cl. ............... 375/152; 375/136; 375/142; 375/143; 375/150; 375/343

(58) Field of Classification Search ......... 375/130–153, 375/326, 280; 342/352, 132
See application file for complete search history.

(56) References Cited

U.S. PATENT DOCUMENTS

| | | | |
|---|---|---|---|
| 3,604,911 A | 9/1971 | Schmitt | 235/181 |
| 3,975,628 A | 8/1976 | Graves et al. | 250/199 |
| 4,426,712 A | 1/1984 | Gorski-Popiel | 375/96 |
| 4,445,118 A | 4/1984 | Taylor et al. | 343/357 |
| 4,463,357 A | 7/1984 | MacDoran | 343/460 |
| 4,485,477 A * | 11/1984 | Nossen | 375/150 |
| 4,578,678 A | 3/1986 | Hurd | 343/357 |
| 4,667,203 A | 5/1987 | Counselman, III | 342/357 |
| 4,701,934 A | 10/1987 | Jasper | 375/1 |
| 4,754,465 A | 6/1988 | Trimble | 375/1 |
| 4,785,463 A | 11/1988 | Janc et al. | 375/1 |
| 4,809,005 A | 2/1989 | Counselman, III | 342/352 |
| 4,821,294 A | 4/1989 | Thomas, Jr. | 375/96 |
| 4,890,233 A | 12/1989 | Ando et al. | 364/457 |

(Continued)

FOREIGN PATENT DOCUMENTS

EP 0639901 A2 8/1994

(Continued)

OTHER PUBLICATIONS

D. J. R. Van Nee and A. J. R. M. Coenen, "New Fast GPS Code-Acquistion Technique Using FFT," Jan. 17, 1991, *Electronics Letters*, vol. 27, No. 2.

(Continued)

*Primary Examiner*—Curtis B Odom
(74) *Attorney, Agent, or Firm*—The Eclipse Group LLP (57) ABSTRACT

A method and apparatus for a spread spectrum matched filter with Doppler correction suitable for using in a radio frequency receiver. The system includes a signal sampler operable to receive signal data and a Doppler shift system operable to provide a Doppler shift correction value. The system also includes a time domain signal processor in signal communication with the signal sampler, the Doppler shift system and the code signal input, the time domain signal processor operable to shift the signal data by the Doppler shift correction value and to determine a correlation between the shifted signal data and the code signal input. The system reduces a waveform representing Doppler correction values into a Boolean combination that may selectively represent the waveform and be implemented by the processing of a matched filter.

26 Claims, 7 Drawing Sheets

U.S. PATENT DOCUMENTS

| | | | |
|---|---|---|---|
| 4,894,662 A | 1/1990 | Counselman | 342/357 |
| 4,894,842 A | 1/1990 | Broekhoven et al. | |
| 4,992,720 A | 2/1991 | Hata | 320/23 |
| 4,998,111 A | 3/1991 | Ma et al. | 342/352 |
| 5,007,068 A * | 4/1991 | Simon et al. | 375/280 |
| 5,014,066 A | 5/1991 | Counselman, III | 342/352 |
| 5,018,088 A | 5/1991 | Higbie | 364/574 |
| 5,036,329 A | 7/1991 | Ando | 342/357 |
| 5,043,736 A | 8/1991 | Darnell et al. | 342/357 |
| 5,108,334 A | 4/1992 | Eschenbach et al. | 455/314 |
| 5,148,042 A | 9/1992 | Nakazoe | 307/65 |
| 5,153,591 A | 10/1992 | Clark | 341/51 |
| 5,175,557 A * | 12/1992 | King et al. | 342/357.12 |
| 5,179,724 A | 1/1993 | Lindoff | 455/76 |
| 5,202,829 A | 4/1993 | Geier | 364/449 |
| 5,225,842 A | 7/1993 | Brown et al. | 342/357 |
| 5,253,268 A | 10/1993 | Omura et al. | 375/1 |
| 5,276,765 A | 1/1994 | Fremman et al. | 395/2 |
| 5,293,170 A | 3/1994 | Lorenz et al. | 376/309 |
| 5,293,398 A | 3/1994 | Hamao et al. | 375/1 |
| 5,297,097 A | 3/1994 | Etoh et al. | 365/226 |
| 5,311,195 A | 5/1994 | Mathis et al. | 342/357 |
| 5,323,164 A | 6/1994 | Endo | 342/357 |
| 5,343,209 A | 8/1994 | Sennott et al. | 342/357 |
| 5,345,244 A | 9/1994 | Gildea et al. | 342/357 |
| 5,347,536 A | 9/1994 | Meehan | 375/1 |
| 5,352,970 A | 10/1994 | Armstrong, II | 320/39 |
| 5,363,030 A | 11/1994 | Ford et al. | 320/13 |
| 5,378,155 A | 1/1995 | Eldridge | 434/11 |
| 5,379,224 A | 1/1995 | Brown et al. | 364/449 |
| 5,396,515 A | 3/1995 | Dixon et al. | 375/208 |
| 5,402,346 A | 3/1995 | Lion et al. | 364/436 |
| 5,402,347 A | 3/1995 | McBurney et al. | 364/443 |
| 5,410,747 A | 4/1995 | Ohmagari et al. | 455/118 |
| 5,416,712 A | 5/1995 | Geier et al. | 364/450 |
| 5,418,818 A | 5/1995 | Marchetto et al. | 375/264 |
| 5,420,593 A | 5/1995 | Niles | 342/357 |
| 5,440,311 A * | 8/1995 | Gallagher et al. | 342/132 |
| 5,440,313 A | 8/1995 | Osterdock et al. | 342/352 |
| 5,450,344 A | 9/1995 | Woo et al. | 364/449 |
| 5,498,239 A | 3/1996 | Galel et al. | 604/95 |
| 5,504,684 A | 4/1996 | Lau et al. | 364/443 |
| 5,546,445 A | 8/1996 | Dennison et al. | 379/60 |
| 5,548,613 A | 8/1996 | Kahu et al. | 375/208 |
| 5,550,811 A | 8/1996 | Kahu et al. | 370/18 |
| 5,568,473 A | 10/1996 | Hemmati | 370/18 |
| 5,577,023 A | 11/1996 | Marum et al. | 370/16 |
| 5,577,025 A | 11/1996 | Skinner et al. | |
| 5,586,148 A * | 12/1996 | Furukawa et al. | 375/340 |
| 5,592,173 A | 1/1997 | Lau et al. | 342/357 |
| 5,594,453 A | 1/1997 | Rodal et al. | 342/357 |
| 5,608,722 A | 3/1997 | Miller | 370/320 |
| 5,623,485 A | 4/1997 | Bi | |
| 5,625,668 A | 4/1997 | Loomis et al. | 379/58 |
| 5,640,429 A | 6/1997 | Michaels et al. | 375/340 |
| 5,640,431 A | 6/1997 | Bruckert et al. | |
| 5,642,377 A | 6/1997 | Chung et al. | 375/200 |
| 5,644,591 A | 7/1997 | Sutton | 375/200 |
| 5,649,000 A | 7/1997 | Lee et al. | 455/436 |
| 5,650,792 A | 7/1997 | Moore et al. | 343/725 |
| 5,654,718 A | 8/1997 | Beason et al. | 342/357 |
| 5,663,734 A | 9/1997 | Krasner | 342/357 |
| 5,663,735 A | 9/1997 | Eshenbach | 342/357 |
| 5,689,814 A | 11/1997 | Hagisawa et al. | 455/69 |
| 5,722,061 A | 2/1998 | Hutchison, IV et al. | 455/245.1 |
| 5,734,674 A | 3/1998 | Fenton et al. | |
| 5,734,966 A | 3/1998 | Farrer et al. | 455/63 |
| 5,737,329 A | 4/1998 | Horiguchi | 370/342 |
| 5,739,596 A | 4/1998 | Takizawa et al. | 307/66 |
| 5,749,067 A | 5/1998 | Barrett | 704/233 |
| 5,781,156 A | 7/1998 | Krasner | 342/357 |
| 5,784,695 A | 7/1998 | Upton et al. | 455/442 |
| 5,786,789 A | 7/1998 | Janky | 342/357 |
| 5,812,087 A | 9/1998 | Krasner | 342/357 |
| 5,825,327 A | 10/1998 | Krasner | 342/357 |
| 5,828,694 A | 10/1998 | Schipper | 375/208 |
| 5,831,574 A | 11/1998 | Krasner | 342/357 |
| 5,832,021 A | 11/1998 | Kondo | 375/200 |
| 5,841,396 A | 11/1998 | Krasner | 342/357 |
| 5,845,203 A | 12/1998 | LaDue | 455/414 |
| 5,852,630 A * | 12/1998 | Langberg et al. | 375/219 |
| 5,854,605 A | 12/1998 | Gildea | 342/357 |
| 5,862,465 A | 1/1999 | Ou | 455/234.1 |
| 5,867,535 A | 2/1999 | Phillips et al. | 375/295 |
| 5,867,795 A | 2/1999 | Novis et al. | 455/566 |
| 5,872,540 A | 2/1999 | Casabona et al. | 342/362 |
| 5,874,914 A | 2/1999 | Krasner | 342/357 |
| 5,877,724 A | 3/1999 | Davis | 342/357 |
| 5,877,725 A | 3/1999 | Kalafus | 342/357 |
| 5,881,371 A | 3/1999 | Reynolds | 455/83 |
| 5,883,594 A | 3/1999 | Lau | 342/357 |
| 5,884,214 A | 3/1999 | Krasner | 701/207 |
| 5,889,474 A | 3/1999 | LaDue | 340/825.49 |
| 5,903,654 A | 5/1999 | Milton et al. | 380/49 |
| 5,907,809 A | 5/1999 | Molnar et al. | 455/456 |
| 5,909,640 A | 6/1999 | Farrer et al. | 455/63 |
| 5,917,444 A | 6/1999 | Loomis et al. | 342/357 |
| 5,917,829 A | 6/1999 | Hertz et al. | |
| 5,920,283 A | 7/1999 | Shaheen et al. | 342/357 |
| 5,923,703 A | 7/1999 | Pon et al. | 375/209 |
| 5,924,024 A | 7/1999 | Ikeda et al. | 455/313 |
| 5,926,131 A | 7/1999 | Sakumoto et al. | 342/357 |
| 5,936,572 A | 8/1999 | Loomis et al. | 342/357 |
| 5,943,363 A | 8/1999 | Hanson et al. | 375/206 |
| 5,945,944 A | 8/1999 | Krasner | 342/357.06 |
| 5,956,328 A | 9/1999 | Sato | 370/335 |
| 5,963,582 A | 10/1999 | Stansell, Jr. | 375/200 |
| 5,970,084 A | 10/1999 | Honda | 375/200 |
| 5,977,909 A | 11/1999 | Harrison et al. | 342/357.09 |
| 5,982,324 A | 11/1999 | Watters et al. | 342/357.06 |
| 5,987,016 A | 11/1999 | He | 370/335 |
| 5,991,309 A | 11/1999 | Jensen et al. | 370/492 |
| 5,991,613 A | 11/1999 | Euscher et al. | 455/277.1 |
| 5,995,537 A | 11/1999 | Kondo | 375/208 |
| 5,999,124 A | 12/1999 | Sheynblat | 342/357.09 |
| 6,002,362 A | 12/1999 | Gudat | 342/357.03 |
| 6,002,363 A | 12/1999 | Krasner | 342/357.1 |
| 6,002,709 A | 12/1999 | Hendrickson | 375/206 |
| 6,005,885 A * | 12/1999 | Warren et al. | 375/152 |
| 6,005,903 A * | 12/1999 | Mendelovicz | 375/367 |
| 6,009,551 A | 12/1999 | Sheynblat | 714/776 |
| 6,016,119 A | 1/2000 | Krasner | 342/357.06 |
| 6,023,462 A | 2/2000 | Nieczyporowicz et al. | 370/335 |
| 6,041,222 A | 3/2000 | Horton et al. | 455/255 |
| 6,044,105 A * | 3/2000 | Gronemeyer | 375/152 |
| 6,047,016 A | 4/2000 | Ramberg et al. | 375/200 |
| 6,047,017 A | 4/2000 | Cahn et al. | 375/200 |
| 6,049,715 A | 4/2000 | Willhoff et al. | 455/436 |
| 6,052,081 A | 4/2000 | Krasner | 342/357.02 |
| 6,061,018 A | 5/2000 | Sheynblat | 342/357.06 |
| 6,064,336 A | 5/2000 | Krasner | 342/357.05 |
| 6,064,688 A | 5/2000 | Yanagi | 375/149 |
| 6,075,809 A | 6/2000 | Naruse | 375/147 |
| 6,104,338 A | 8/2000 | Krasner | 342/357.06 |
| 6,104,340 A | 8/2000 | Krasner | 342/357.1 |
| 6,107,960 A | 8/2000 | Krasner | 342/357.09 |
| 6,111,540 A | 8/2000 | Krasner | 342/357.1 |
| 6,131,067 A | 10/2000 | Girerd et al. | 701/213 |
| 6,133,871 A | 10/2000 | Krasner | 342/357.06 |
| 6,133,873 A | 10/2000 | Krasner | 342/357.12 |
| 6,133,874 A | 10/2000 | Krasner | 342/357.15 |
| 6,150,980 A | 11/2000 | Krasner | 342/357.1 |
| 6,151,353 A * | 11/2000 | Harrison et al. | 375/136 |
| 6,198,765 B1 * | 3/2001 | Cahn et al. | 375/142 |

| | | | | |
|---|---|---|---|---|
| 6,289,041 B1 * | 9/2001 | Krasner | ............... | 375/152 |
| 6,356,602 B1 * | 3/2002 | Rodal et al. | ............... | 375/344 |
| 6,714,983 B1 * | 3/2004 | Koenck et al. | ............... | 709/230 |

FOREIGN PATENT DOCUMENTS

| EP | 0639901 A3 | 8/1994 |
|---|---|---|
| JP | 08/065205 A | 3/1996 |
| WO | WO 92/13392 | 8/1992 |
| WO | WO 97/14053 | 4/1997 |
| WO | WO 00/19644 | 4/2000 |

OTHER PUBLICATIONS

Holm, Eric D. and Westerfield, Edwin E., "A GPS Fast Acquisition Receiver," vol. 14, pp. 214-218, The John Hopkins University Applied Physics Laboratory: National Telesystems Conference, New York, I.E.E.E., U.S., Nov. 14, 1983.

Levanon, N., and Getz, B., "Comparison between linear FM and phase-coded CW radars" *IEE, Proc.-Radar, Sonar Navig.*, Institution of Electrical Engineers, vol. 141, No. 4, pp. 230-240, Aug. 1, 1994.

* cited by examiner

DOPPLER CORRECTED SPREAD SPECTRUM MATCHED FILTER

CROSS-REFERENCE TO RELATED APPLICATIONS

This application is a continuation in part of Non-Provisional patent application Ser. No. 09/145,055, filed on Sep. 1, 1998, now U.S. Pat. No. 6,044,105 and entitled DOPPLER CORRECTED SPREAD SPECTRUM MATCHED FILTER.

FIELD OF THE INVENTION

This invention relates to electronic communication systems. More particularly the invention relates to a spread spectrum matched filter with Doppler correction suitable for use in a radio frequency receiver.

BACKGROUND

Conventionally, data communication systems typically use narrow band modulation techniques, such as amplitude modulation (AM), frequency modulation (FM), frequency shift keying (FSK), binary phase shift keying (BPSK), quadrature phase shift keying (QPSK), and quadrature amplitude modulation (QAM). With such systems, demodulation at the receiver may be achieved with a relatively small amount of circuitry. However, these types of systems suffer from several problems including multipath fading and narrow band noise.

In contrast, in spread spectrum communication systems, a data spectrum is spread by a pseudo-noise (PN) code at a transmitter while the PN code and the data are synchronized at a receiver. The PN code is composed of a binary sequence that is often referred to as the "chip sequence". The binary symbols in the chip sequence are referred to as "chips" and it is appreciated by those skilled in the art that the transmitter and intended receiver both have available the same chip sequence. This technique reduces the adverse effects of multipath fading and narrow band noise. The military has employed spread spectrum communication systems to both combat the intentional jamming and detection of radio and satellite communication links. Accordingly, spread spectrum communication systems have attracted increased attention as a promising technique for radio frequency transmission of binary data in the non-military sector.

One of the two most common spread spectrum techniques, referred to as frequency hopping spread spectrum (FH-DSS), employs the chip sequence to shift, over a wide bandwidth, the carrier frequency of a conventional narrow band transmitter signal. The other common technique, referred to as direct sequence spread spectrum (DS-DSS), directly multiplies a conventional narrow band signal by the chip sequence. The chip rate is typically much higher than the data rate of the conventional narrow band signal. In both of these common spread spectrum techniques, a conventional narrow band signal is viewed as a carrier that is either frequency modulated or directly multiplied by the chip sequence. It is appreciated that other types of spread spectrum systems include combinations of both FH-DSS and DS-DSS in one system.

Spread spectrum signals allow more than one transmission signal in the same frequency and time interval when each signal uses a different chip sequence. This technique is known as code division multiple access (CDMA). An example application of Direct Sequence CDMA (DS-CDMA) is the Global Positioning System (GPS). The GPS system uses DS-CDMA to broadcast time and position data to receivers, which use such data to determine position and navigation information.

The subject of spread spectrum communications is described in a three book series by Marvin K. Simon, Jim K. Omura, Robert A. Scholtz, and Barry K. Levitt, *Spread Spectrum Communications*, Volume I, II, and III, Rockville, Md.: Computer Science Press, 1985. See also Robert A. Scholtz, *The Origins of Spread-spectrum Communications*, IEEE Transactions on Communications, COM 30, pp. 822-854, May 1982; Rober A. Scholtz, *Notes on Spread-spectrum History*, IEEE Transactions on Communications, COM-31, pp. 82-84, January 1983; and Robert Price, *Further Notes and Anecdotes on Spread Spectrum Origins*, IEEE Transactions on Communications, COM 31, pp. 85-97, January 1983.

In a spread spectrum system, the conventional narrow band signal is spread by a PN code signal that has a wider bandwidth than the conventional narrow band signal. In order to correctly restore the conventional narrow band signal, the demodulation PN code generated at the receiving side is synchronized to the modulation PN code generated at the transmitting side. Proper phase synchronization is typically achieved when the received spread spectrum signal is accurately timed in both its spreading PN code pattern position and its rate of chip generation. The phase synchronization process is preferably accomplished in two stages: an initial synchronization process to find a synchronous phase, and a process to track the detected phase. Known techniques for initial synchronization depend upon both analog and digital sliding correlators, matched filters and other equivalent devices.

In a conventional matched filter spread spectrum receiver, the receiver includes a radio frequency (RF) section that receives the spread spectrum signal having a PN code modulated therein. The receiver converts the received spread spectrum signal into an intermediate-frequency (IF) signal. An in-phase converter and a quadrature-phase converter convert the IF signal into an in-phase (I-channel) spread signal and a quadrature-phase (Q-channel) spread signal. A PN code sync device de-spreads the received PN code modulated from the spread spectrum signal by synchronizing a reference PN code with the received PN code and maintaining the two codes in fine synchronism using, for example, a pair of correlators or a tracking loop based on a matched filter. A data demodulator demodulates the spread spectrum signal into the original baseband (narrow band) signal. Utilizing a matched filter has the advantage that the transmitted spread spectrum signal may be acquired relatively quickly even with relatively large initial errors between the locally generated PN code and the received PN code.

In a DS-CDMA system such as a GPS receiver, a matched filter may selectively be utilized to receive signals from multiple transmitters such as satellites using a single set of receiver samples. However, each signal has a different PN code and a different amount of Doppler shift. If the receiver samples are Doppler corrected before the samples are stored in the matched filter, new signal samples or new Doppler correction samples are required for each received signal. This process lowers the rate at which the matched filter is utilized and also increases the power consumption of the receiver due to the filter loading process. Accordingly, there is a need for a Doppler corrected spread spectrum receiver that avoids the limitations of the prior art, has low power consumption, and is fast.

SUMMARY OF THE INVENTION

It is to be understood that both the foregoing general description and the following detailed description are exemplary and explanatory only and are not restrictive of the invention, as claimed.

The above problems are solved, and a number of technical advances are achieved in the art, by implementation of a improved Doppler corrected matched filter system and method in a spread spectrum environment. In accordance with the invention, a Doppler corrected matched filter system for processing communication data from a code signal input is described.

In one example, the system includes a signal sampler operable to receive signal data and a Doppler shift system operable to provide a Doppler shift correction value. The system also includes a time domain signal processor in signal communication with the signal sampler, the Doppler shift system and the code signal input, the time domain signal processor operable to shift the signal data by the Doppler shift correction value and to determine a correlation between the shifted signal data and the code signal input.

The system reduces a waveform representing Doppler correction values into a Boolean combination that may selectively represent the waveform and be implemented by the processing of a matched filter. Advantages include faster use of the matched filter, resulting in faster signal acquisition, and lower power consumption because clocking to load signal and/or Doppler correction values is reduced. In particular, received samples may selectively be Doppler corrected for the nominal or mean Doppler shift plus local oscillator error as they are stored. The remaining Doppler shift is relatively small and may be removed by building a few Doppler offsets into the processing logic for each matched filter tap. This saves time because the Doppler shift may be changed almost instantly. It also saves power because the new signal or Doppler signals do not have to be shifted or scanned into the matched filter.

The details of one or more alternative examples of the invention are set forth in the accompanying drawings and the description below. Other features and advantages of the invention will be apparent to those skilled in the art from the description and drawings, and from the claims.

BRIEF DESCRIPTION OF DRAWINGS

The summary of the invention, as well as the following detailed description of the present invention, as defined in the claims, is better understood when read in conjunction with the accompanying drawings. The following figures of the drawings are included by way of example, and not by way of limitation with regard to the claimed invention. The components within the drawings are not necessarily to scale relative to each other. The figures of the drawings are:

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION

The invention includes a spread spectrum matched filter with Doppler correction suitable for use in a radio frequency receiver. The Doppler corrected matched filter is particularly suitable for use in a GPS radio frequency receiver. The Doppler corrected matched filter system serves a number of applications. In a normal navigation application, the Doppler corrected matched filter system described below may selectively output code phase information that allows a signal processing tracking loop to directly acquire prepositioning data for a particular GPS satellite. The Doppler corrected matched filter system may then be utilized selectively in support of reacquisition and anti-multipath operations. In a single fix application, the Doppler corrected matched filter system may selectively provide the only data required because the signal processing channels are not employed. The Doppler corrected matched filter may also be selectively utilized in conjunction with other spread spectrum radio receivers.

System Architecture

Figure 1:
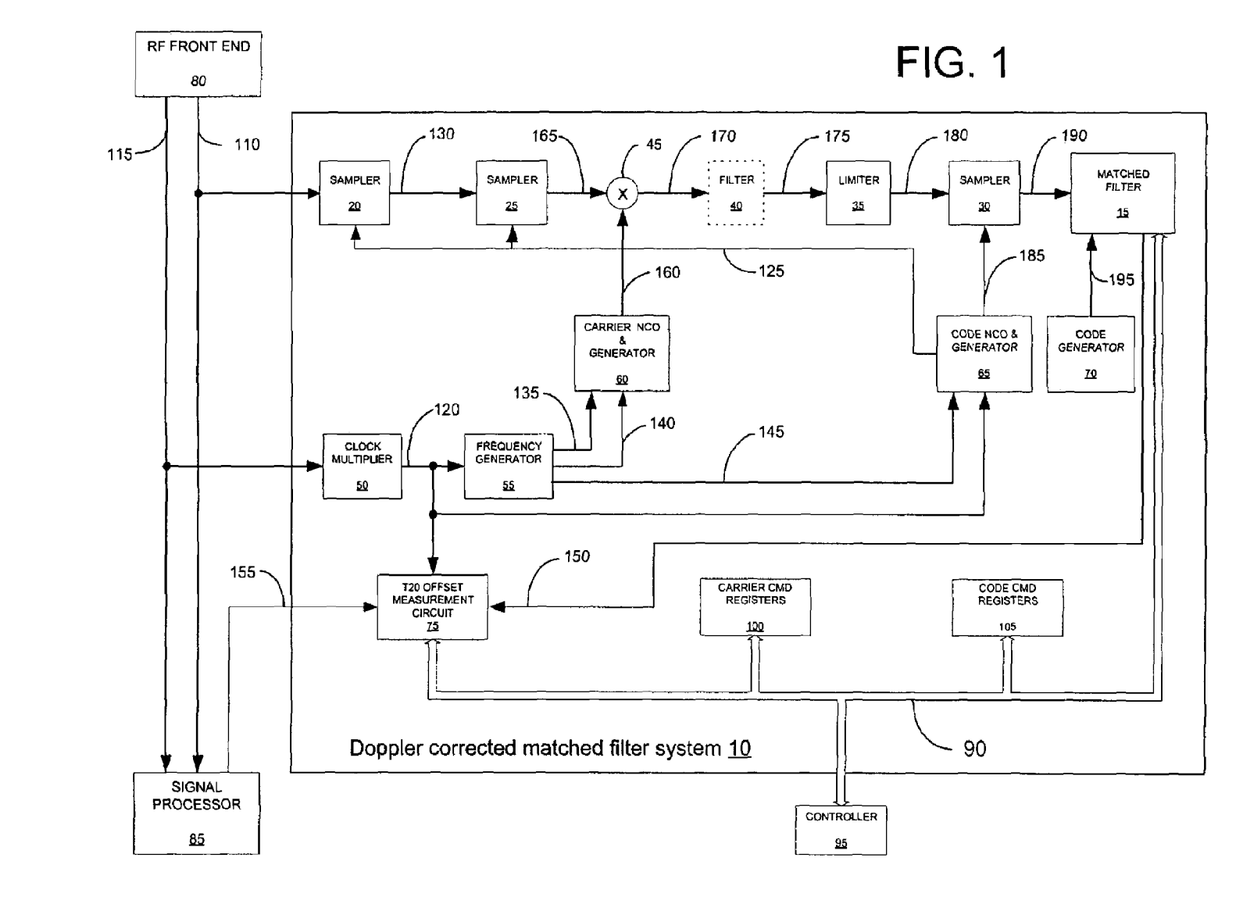
FIG. 1 is a block diagram of an example implementation of a system utilizing a Doppler corrected matched filter in accordance with the invention.

Referring now in detail to the drawings in which the reference numerals indicate like parts throughout several views. FIG. 1 is a block diagram showing an example implementation of a Doppler corrected matched filter system 10 utilizing a matched filter 15 in accordance with the invention. The Doppler corrected matched filter system 10 includes three sets of samplers 20, 25 and 30 (i.e., the samplers may selectively be latches), respectively, a limiter 35, an optional filter 40, the matched filter 15, and a mixer 45. The Doppler corrected matched filter system 10 also includes clock multiplier 50, frequency generator 55, carrier numerically controller oscillator (NCO) and generator 60, a code NCO and generator 65, a code generator 70, and a T20 offset measurement circuit 75.

The system 10 may be utilized in various contexts, such as in communications or navigation applications. The Doppler corrected matched filter system 10 is in signal communication with a conventional spread spectrum radio frequency (RF) receiver front end 80 and a signal processor 85. The Doppler corrected matched filter system 10 has an interface to an external bus 90 over which the Doppler corrected matched filter system 10 may receive commands from a controller 95 (for example, in a carrier command register set 100 and/or a code command register set 105) and provide output results to the controller 95. The external bus 90 is in signal communication with a controller 95. The Doppler corrected matched filter system 10 may be integrated into a receiver system, or may constitute a separate device.

The controller 95 may selectively be any general-purpose processor such as an Intel XXX86, Motorola 68XXX or PowerPC, or other equivalent processor capable of running software instructions (not shown) resident on the controller 95. Alternatively, a GPS-specific circuit or oriented device may selectively also be utilized. It is appreciated that the controller 95 may also be selectively integrated into a signal semiconductor chip such as an Application Specific Integrated Chip (ASIC) or Reduced Instruction Set Computer (RISC), or may be implemented via a Digital Signal Processor (DSP) chip. The "Scorpio" 11577-11 digital integrated circuit produced by Conexant Systems, Inc. is an example of a GPS-oriented device.

The RF receiver front end 80 converts a received spread spectrum signal into an intermediate-frequency (IF) signal and then converts the IF signal into an in-phase I signal and a quadrature-phase Q signal 110 which correspond to the real and imaginary parts of the received signal. For example purposes, the I and Q signals are each represented as 2-bit binary values in the range of −1, 0, and +1. It is appreciated that the −1 value is preferably represented as the 2's complement of the value 1. Thus, the 2-bit binary values would be 00, 01, and 11. The RF receiver front end 80 also provides a clock signal 115 to the Doppler corrected matched filter system 10 via the clock multiplier 50. In a GPS DS-CDMA system, the fundamental frequency $F_0$ is 10.23 MHz. This fundamental frequency is converted by the RF front end 80 to the clock signal 115 having a frequency $$f = F_0 \frac{137}{128}$$

(or about 11 MHz). The frequency $$f = F_0 \frac{137}{128}$$

is then coupled to the clock multiplier 50. The signal processor 85 also receives the I and Q signals 110 and clock signal 115 from the RF receiver front end 80, and may have control signals in signal communication with the RF receiver front end 80, in known fashion.

Examples of the RF receiver front end 80 may be a "Gemini/Pisces Monopack" R6732-13 integrated circuit available from Conexant Systems, Inc. or the equivalent. The signal processor 85 may be, for example, the "Scorpio" 11577-11 integrated circuit also available from Conexant Systems, Inc. or the equivalent.

In an example implementation of the Doppler corrected matched filter system 10, input processing receives an input sample stream of data, reduces the sampling rate of the data, and stores 20 milliseconds (ms) worth of the resulting data samples. In this example, the Doppler corrected matched filter system 10 reduces the data sampling rate to about 2.046 MHz and stores complex data samples, each represented by a three level I sample (i.e., I=−1+j0, 0+j0 and 1+j0) and a three level Q sample (i.e., I=0−j, 0+j0 and 0+j). As a part of the sample rate reduction, the received samples go through a complex mixing process to remove the $$f = F_0 \frac{1}{8}$$

(or about 1.28 MHz), IF frequency, plus any desired offset frequency due to an estimated error in the frequency standard or to average Doppler shift. The 20 ms period during which the samples are taken is related to a T20 by means of an offset counter (not shown). It is appreciated that this relationship allows the correlation values output by the Doppler corrected matched filter system 10 may be related in time to the code phase settings of the various signal processing channels in a signal processor such as signal processor 85. In particular, the system 10 utilizes the stored samples multiple times to calculate the cross correlation values between the received samples and several combinations of PN codes and Doppler shifts. The results of these operations are then supplied to the controller 95 (which may be part of the signal processor 85) via the external bus 90.

More particularly, in the Doppler corrected matched filter system 10, the clock multiplier 50 generates a $$f = F_0 \frac{137}{32}$$

(or about 44 MHz) clock signal 120 from the input 11 MHz clock signal 115. The 44 MHz clock signal 120 is applied to the code NCO 65. The code NCO 65 generates a code clock 125 to re-sample the I and Q signals 110 in sampler 20. The code clock 125 sample frequency has a nominal rate of f=2$F_0$ (or about 20.46 MHz) that is modified by commands from the controller 95 via code command register 105 to account for estimated values of average Doppler and IF error. The re-sampled data is then applied to the second sampler 25 via signal path 130. The second sampler 25 is also clocked by code clock 125.

The 44 MHz clock signal 120 is also applied to the frequency generator 55 which generates output signals of frequencies of f=2$F_0$ (or about 20.46 MHz) 135;

$$f = F_0 \frac{1}{8}$$

(or about 1.28 MHz) 140; and clock 145 at $$f = F_0 \frac{1}{30}$$

(or about 341 kHz). The clocks 140 and 145 preferably have selectable rates of $$f = F_0 \frac{1}{2}$$

(or about 5.115 MHz) and $$f = F_0 \frac{1}{60}$$

(or about 171 kHz). These selectable rates accommodate a wider range of NCO frequencies which address systems with possibly less accurate fundamental frequency sources.

The signal processor 85 provides a T20 sync input that may be synchronized to a data capture start signal 150 of the matched filter 15. When the controller 95 commands the matched filter 15 to capture data samples, the matched filter 15 provides a data capture start signal 150 to the T20 offset measurement circuit 75. The T20 offset measurement circuit 75 counts the 44 Mhz clock cycles 120 until there is a transition in the T20 sync input 155. After the data capture is complete, the controller 95 reads the offset counter value from the T20 offset measurement circuit 75 via the external bus 90. The offset measurement allows the controller 95 to use the subsequent matched filter 15 code correlation outputs to initialize tracking loops in the signal processor 85.

The received samples in the second sampler 25 are re-sampled at f=2F$_0$ (or 20.46 MHz), via clock signal 125, from the code NCO and generator 65 in a manner similar to a normal DS-CDMA signal processing channel. The mixer 45 performs a complex multiplication of the output signal 160 of the carrier frequency NCO and generator 60 and the output signal 165 of the second sampler 25. The carrier frequency NCO and generator 60 produces the output signal 160 at the IF frequency, $$f = F_0 \frac{1}{8}$$

(or 1.28 MHz), plus an estimated frequency and average Doppler error. The mixer 45 preferably utilizes the a 7 level (i.e., −3 to 3 and −3j to 3j for I and Q) mixing scheme (similar to a conventional signal processing channel), resulting in an output range for each of the I and Q signals of −6 to +6 and −6j to +6j [i.e., (1+j)(3−3j)=6, (−1−j)(3−3j)=−6, (1+j)(3+3j)=6j, (1−j)(3−3j)=−6j, etc.], represented in 8 bits (i.e., 4 bits real and 4 bits imaginary). The output signal 170 of the mixer 45 stage may then be applied to the optional anti-aliasing filter 40 to limit the bandwidth of the output signal 170 to no more than twice the sampling rate of the third sampler 30 downstream from the filter 40. The filter 40 preferably provides a sliding average of 20 of the input samples to the filter 40.

The processed signal 175, from the either the optional filter 40 or the mixer 45 (same as output 170 if from mixer 45), is then applied to the limiter 35 which limits the range of binary values to −1, 0, and +1, represented in 2 bits each for the I and Q signals, to reduce the amount of data stored for 20 ms of the signal samples. The limited, mixed signal 180 is then re-sampled through the third sampler 30 at a frequency, $$f = F_0 \frac{1}{5},$$

(or about 2.046 MHz) with a signal 185 from the code frequency NCO and generator 65 to reduce the amount of data stored for the 20 ms of signal samples. The output 190 of the third sampler 30 is input into the matched filter 15. A separate code generator 70 provides a desired PN code 195 (chip sequence) to the matched filter 15 (described in further detail below). It is appreciated that the provision of both a carrier NCO/mixer and a code NCO/sampler allows independent correction for a pure frequency shift in the former and of a Doppler shift to both carrier and code in the latter.

Figure 2:
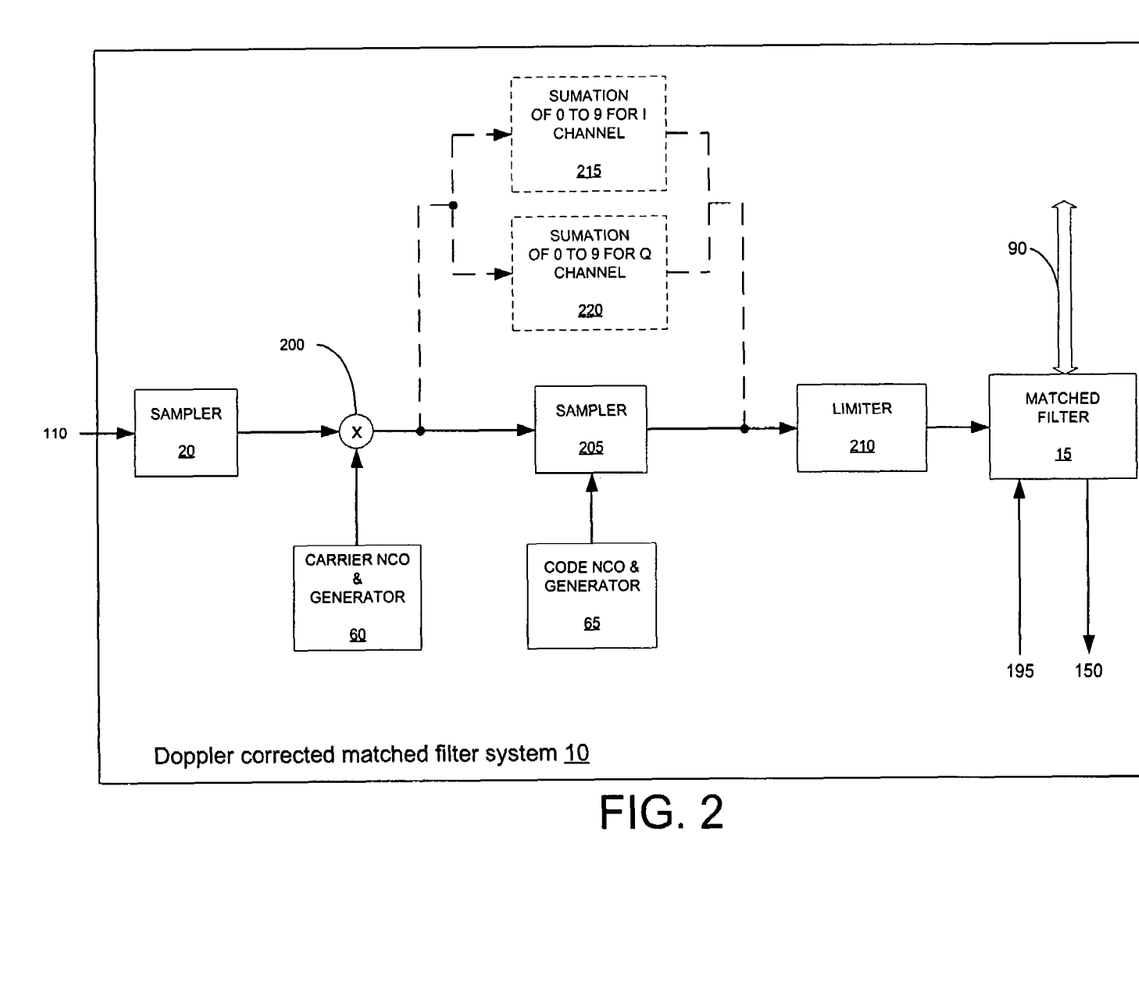
FIG. 2 is a block diagram of an another example of system utilizing a Doppler corrected matched filter.

FIG. 2 is a block diagram of another example implementation of a Doppler corrected matched filter system 10. In this example, the incoming I and Q signals 110 (from the RF front end 80 in FIG. 1) are re-sampled through the first sampler 20 at F$_0$ and then subjected to 5 level (i.e., −2 to 2 and −2j to 2j for I and Q) mixing by mixer 200. Limiting is shown occurring after the second sampler 205 at limiter 210. An alternative approach is shown in dotted outline. In this alternative approach, a filtering operation (through two summing registers 215 for the I channel and 220 for the Q channel) reduces the sample rate by a factor of ten, rather than re-sampling by means of the second sampler 205. It is appreciated that the net effect of the filtering is to reduce the sample rate and correspondingly the size of a sample storage device, while avoiding the loss due to sample rate reduction without the appropriate bandwidth limiting beforehand. This implementation may be preferable when code phase measurements at the output of the matched filter 15 are to be interpolated for improved resolution.

Matched Filter Processing

Figure 3:
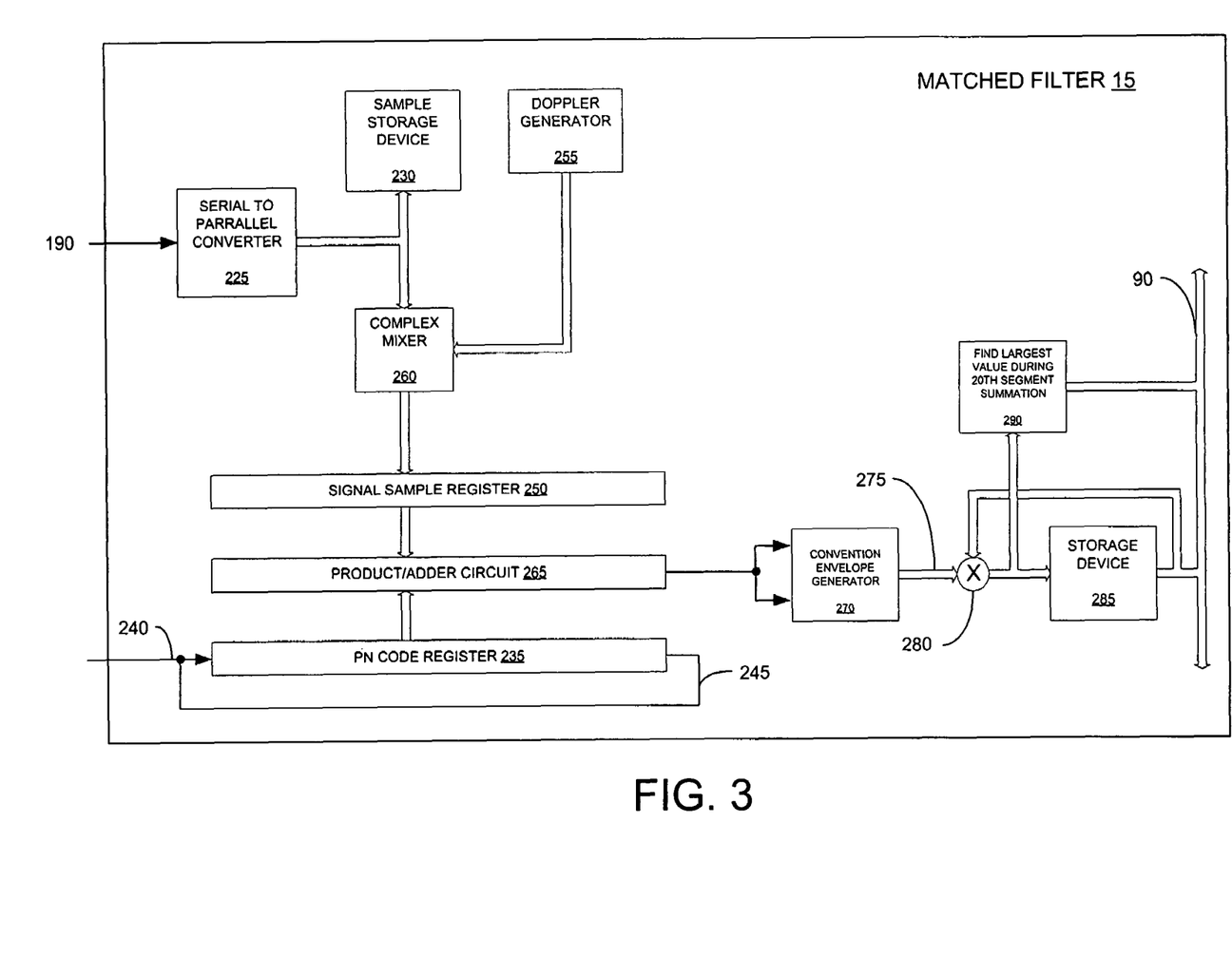
FIG. 3 is a block diagram of an example implementation of a matched filter shown in FIGS. 1 and 2.

Once the received samples are re-sampled and limited, they are stored in the matched filter 15 for repeated processing. FIG. 3 is an example block diagram of a matched filter 15 in accordance with the invention. In this example implementation, the sample signals 190, FIG. 1, are converted by a serial to parallel converter 225, FIG. 3, and stored in a sample storage device 230. The sample storage device 230 may selectively be a 16-bit wide random access memory (RAM) device. With 4-bit complex (i.e., 4-bit for the real I channel and 4-bit for the imaginary Q channel) input samples, the data may selectively be stored as 4 samples for each 16-bit word.

It is appreciated that the 20 ms of data samples are stored in the sample storage device 230. However, the data is processed in 1 ms segments, corresponding to the period of a GPS PN code. Each one millisecond period will have 2046 4-bit complex (i.e., 1023 4-bit real I channel and 1023 4-bit imaginary Q channel) signal samples and 1023 PN code chips, or 2 received samples per PN code chip. The PN chips may selectively be loaded serially into a PN code register 235 via signal path 240 (that may selectively be 195 from FIG. 1) and the PN code is shifted through the PN code register 235 for each code phase via shift path 245. As each one millisecond segment from the sample storage device 230 is about to be processed, it is pre-multiplied by a Doppler shifting circuit (not shown) and then stored in a signal sample register 250. The Doppler shifting circuit comprises a Doppler generator 255 and a complex mixer 260.

The complex mixing operation is similar to the mixing shown in FIG. 1. In FIG. 1, the mixing shifts the code spectrum to near zero frequency offset. In FIG. 3, however, the mixing shifts the spectrum by a relatively small amount, roughly over a range of about 8000 Hz. It is appreciated that there are no more than about 8 cycles of complex local oscillator error in a one millisecond segment of 1023 samples.

It is appreciated that the value of 8000 Hz of fine Doppler correction is not a hard limit. The particular frequency range depends on the basic signal-to-noise ratio of the input samples and the margin associated with this value. The matched filter Doppler correction is selectively applied to the complex phase of the stored samples. The Doppler of the PN code on the envelope of this phase is not corrected in the matched filter because it is corrected in the processing that is done before the samples are stored by means of the re-sampling from $$f = F_0 \frac{137}{32}$$

(or about 44 MHz) down to f=2F$_0$ (or about 20.46 MHz) that is controlled by the NCO frequency setting.

In this example, it is appreciated that both the PN code loading into the PN code register 235 and the Doppler mixing in mixer 260 occur faster than "real time". Preferably, a clock such as f=2F$_0$ would be used. Thus, once data samples are loaded in "real time", subsequent processing may selectively be faster than "real time".

When both the PN code and the Doppler-shifted signal samples are loaded into the PN code register 235 and signal sample register 250, respectively, the correlation process begins. Each complex signal sample is multiplied by its corresponding PN code chip. There are two samples for each code chip, or a pair of half chip spaced correlations for every two samples. All 2046 multiplications may selectively be done at once, since the process is a sign inversion. The resulting products are then input to an adder tree for summation and output as one millisecond of complex coherent integrations. A product/adder circuit 265 performs these functions.

The output of the product/adder circuit 265 is applied to a conventional envelope generator 270, which in the present example calculates the square root of the sum of squares (i.e., the envelope generator 270 may selectively be a square root circuit). The conventional envelope generator 270 determines the envelope of the one millisecond waveform. It is appreciated that this calculation removes any problems associated with signal inversions due to the 50 Hz data modulation on the GPS signal.

The I and Q outputs 275 are then further processed by non-coherently combining their envelope through an mixer 280 with any prior one millisecond correlations for this same PN code phase, previously stored in a storage device 285. A complete cycle of 20 summations is stored in the storage device 285 for each 20 ms PN code cycle. The storage device 285 may selectively be a RAM or other equivalent memory element.

After each such pair of half chip spaced correlations, the PN code register 235 is cyclically shifted by 1 chip, via shift path 245, and the process is repeated. After 1023 such shifts, all 2046 correlations are computed for the current one millisecond segment. At that point, the next 1 ms segment from the sample storage device 230 is Doppler multiplied and loaded into the signal sample register 250. Thus, the process is repeated for each of the 20 one millisecond segments stored in the sample storage device 230. After 20 ms have been processed, the output storage device 285 contains 2046 correlation values. This procedure may selectively be repeated for as many combinations of PN code and Doppler shift as desired.

The final correlation values in the output storage device 285 may be selectively available over the external bus 90 for further processing by other systems. The Doppler corrected matched filter system 10, FIG. 1, may then generate an interrupt to an external signal processor, which may selectively read out the results of the correlation process. As an example, the desired result may be the maximum value and its code phase (located in the storage device 285). However, in other examples, additional information may be required that is different for various applications. For example, samples adjacent to the maximum value may be utilized to provide information about the likelihood of the peak being a cross correlation signal. Smaller peaks at earlier phases may indicate a partially blocked line-of-sight path. The three or four adjacent peaks of a maximum peak may be employed to better define the optimum location of the true correlation peak. In an another example, the Doppler corrected matched filter system 10 may provide a specialized search function 290 that automatically provides the largest correlation value or values (i.e., 8 largest peaks) and the corresponding location (code phase) in the array of 2046 non-coherent sum values after all twenty segments have been processed.

Figure 4:
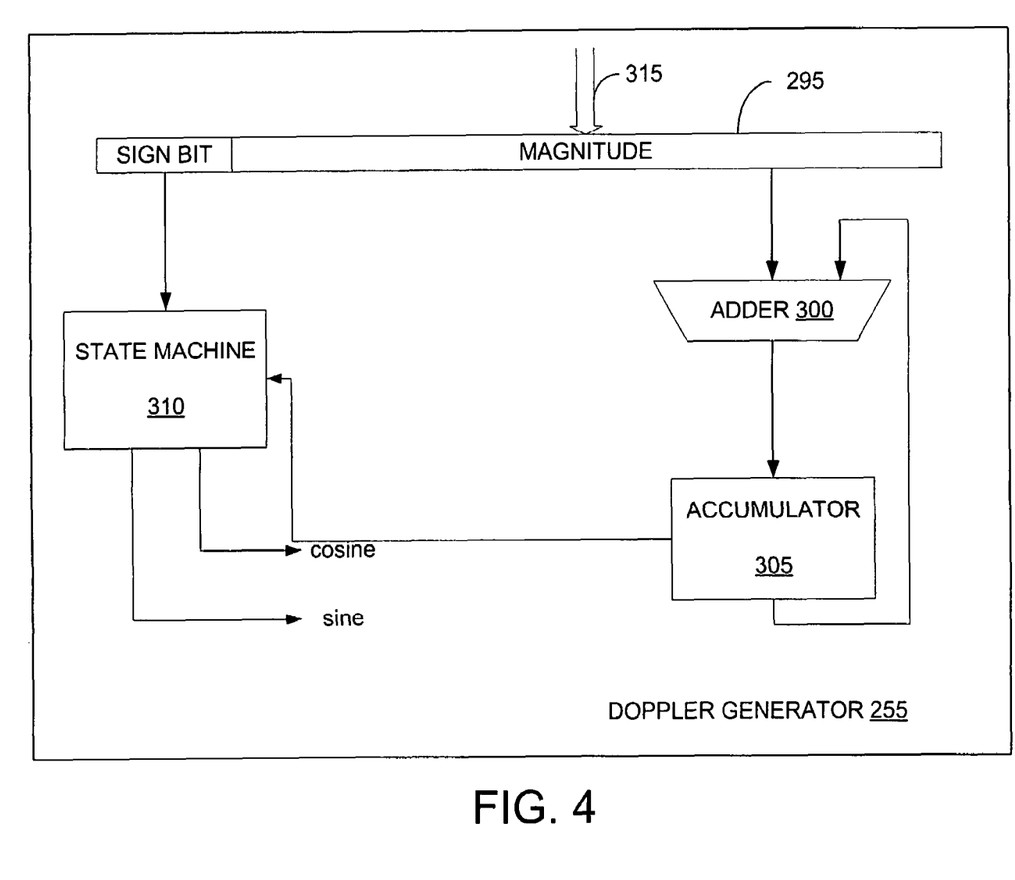
FIG. 4 is a block diagram of an example implementation of a Doppler generator shown in FIG. 3.
Figure 5:
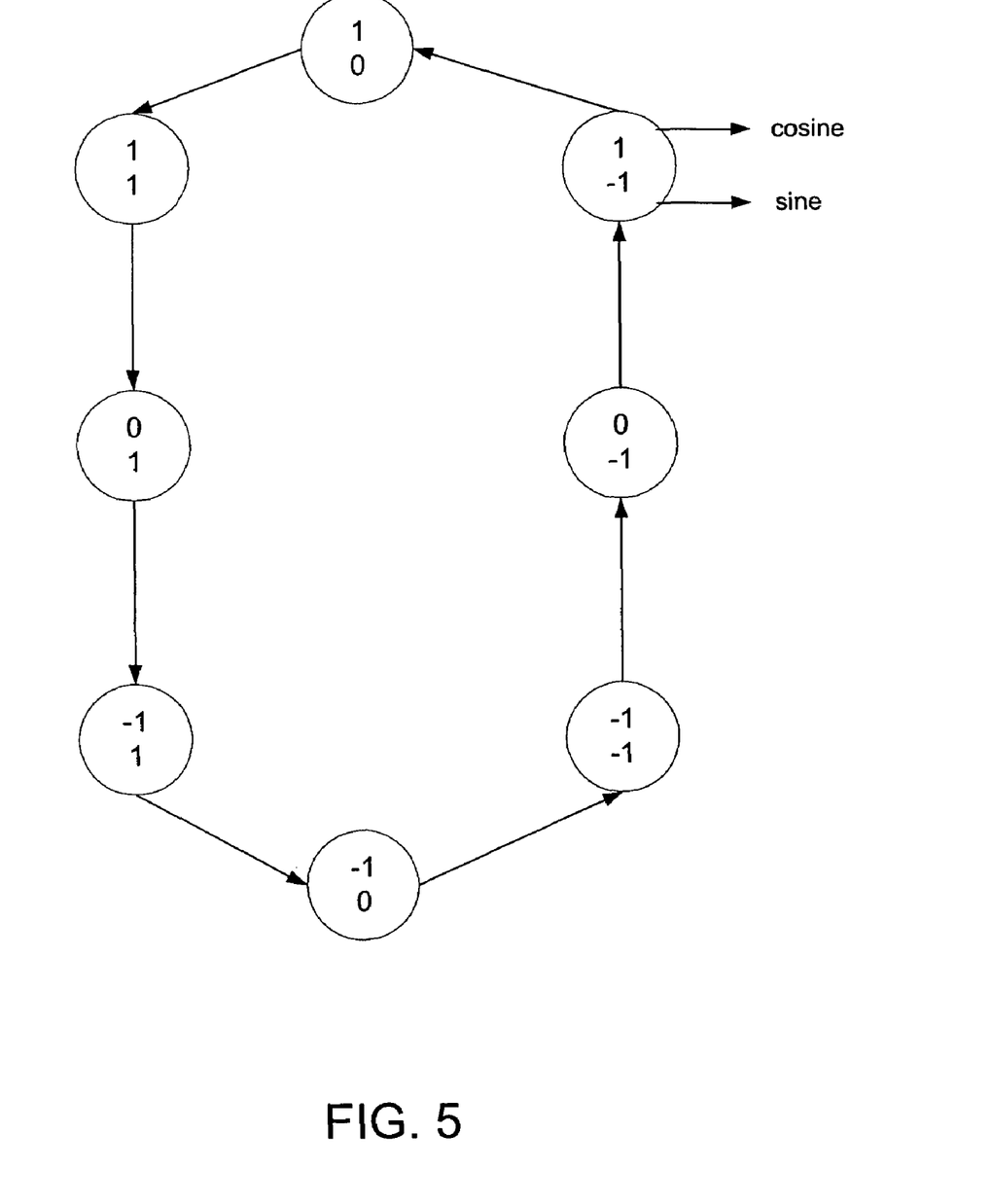
FIG. 5 is a state machine diagram for the state machine shown in FIG. 4.
Figure 6:
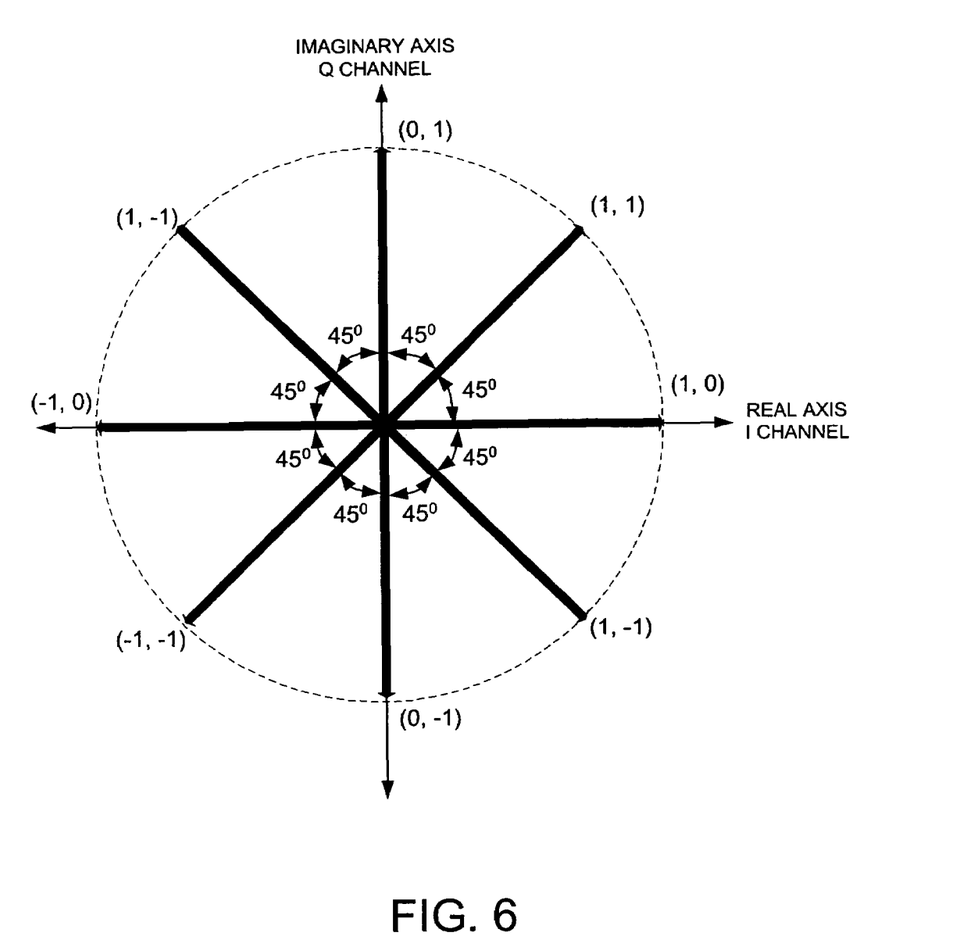
FIG. 6 is a phasor representation of the state machine diagram shown in FIG. 5.

FIG. 4 is a block diagram of an example implementation of a Doppler generator 255 shown in FIG. 3. The Doppler generator 255 includes a register 295 coupled to an adder 300, an accumulator register 305, and a state machine 310. FIG. 5 is a state machine diagram for the state machine 310 shown in FIG. 4. The output of the Doppler generator 255 is a multi-level (i.e., 3 levels) quantized complex phasor (i.e., cos θ+j sin θ where is the phase of the phasor). The phase is quantized to 45 degrees. FIG. 6 is a phasor representation of the state machine diagram shown in FIG. 5.

In operation, a desired Doppler value is written over the bus 315, FIG. 4 (which may be in signal communication with complex mixer 260), into the register 295. The magnitude is added to the accumulator 305 at the same rate that memory elements such as words containing four complex samples are read from the sample storage device 230, FIG. 3. Whenever the accumulator 305 has an overflow condition, the state machine 310 is advanced or retarded one state, depending on the value of the sign bit. The overflow condition represents 45 degrees of accumulated Doppler. In an another example implementation, the Doppler generator 255 may be a lookup table (i.e., in RAM or read only memory (ROM)) with stored pre-computed Doppler shift correction values.

Basic Cell of Matched Filter

Figure 7:
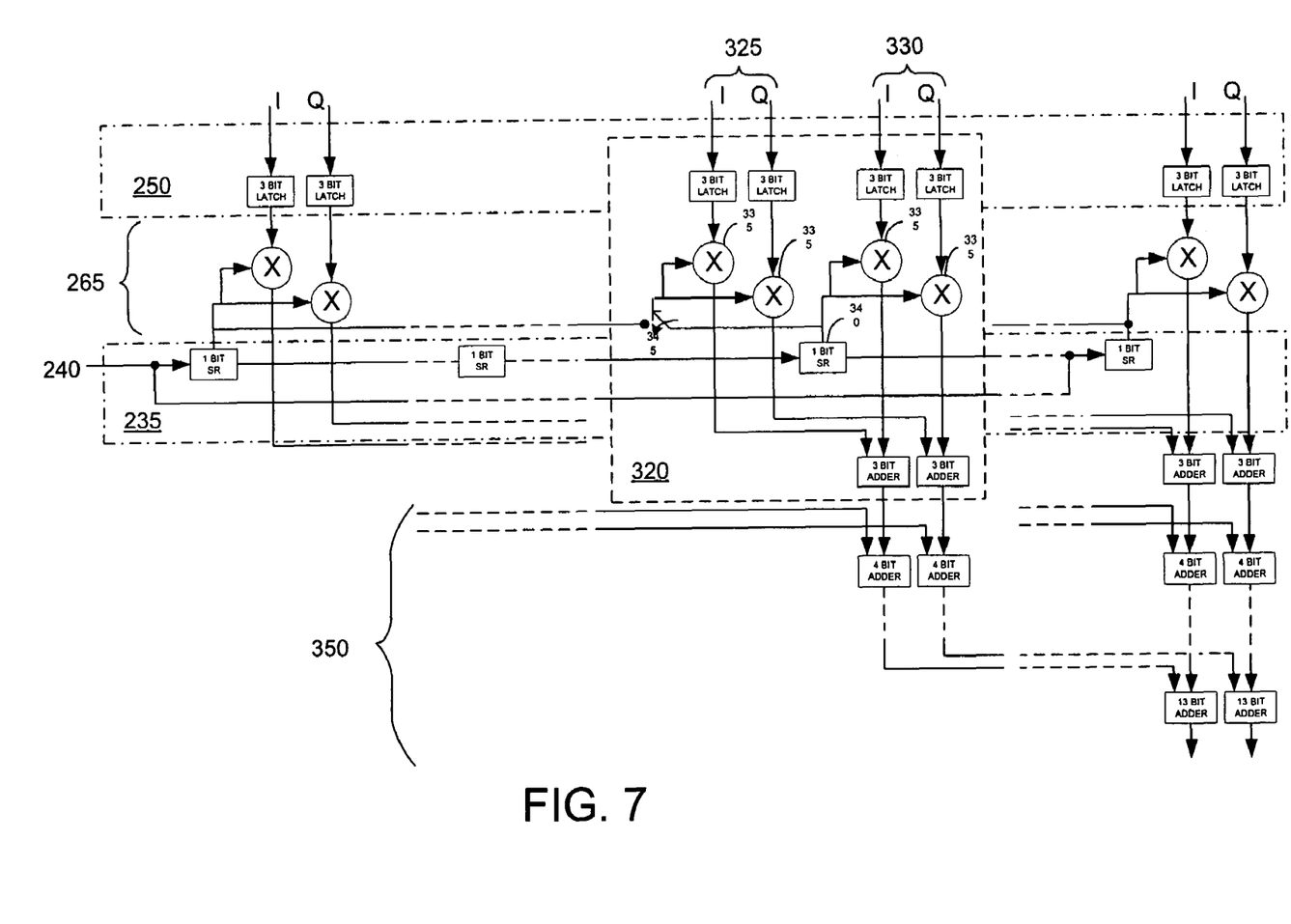
FIG. 7 is a example logic diagram for the register and summing circuitry of the matched filter shown in FIG. 3.

FIG. 7 is a logic diagram for one embodiment of the register and summing circuitry of the matched filter 15 shown in FIG. 3. A basic cell 320 may be defined as including: two pairs 325, 330 of I and Q latches for storing input I and Q data samples each represented as two or three bit quantities that may have the values –1, 0 and +1 (or –2, –1, 0, 1, or 2 for three bits); corresponding one bit multipliers 335 for applying the PN chips as one bit quantities that have the values –1 and +1, hence, the multipliers 335 have the effect of changing the sign bit of the I and Q data values; a corresponding 1 bit shift register PN chip stage 340; and an odd-even switch 345 between cells 320 that allows each PN chip stage 340 to be applied to successive pairs of I and Q latches without shifting the PN code each time, thus saving power (i.e., this feature saves 1023 shift register stages and the power associated with making extra shifts).

The outputs of the multipliers 335 are coupled to an adder tree 350, which hierarchically adds all of the 2046 stages until final I and Q sums are output. The example adder tree 350 shown in has 12 bit adders as the final stage. The width of the adders may selectively be reduced after a few stages. The register and summing circuitry is implemented in relatively few gates because the data widths involved in the basic cell 320 are small.

Programming and Control

The Doppler corrected matched filter system 10 is envisioned as an independent subsystem that is controlled by a processor such as the controller 95 or other equivalent processor. The degree of autonomy required of the Doppler corrected matched filter system system 10 depends primarily on its speed of operation. If the time required to search one code/Doppler bin is on the order of 10-20 ms, then the most likely mode of operation would be for the controller 95 to issue a command to do a load or search, have the Doppler corrected matched filter system 10 execute that command, and then have the controller 95 collect the results and issue a command for the next operation, if necessary. Alternatively, if the Doppler corrected matched filter system 10 is operated at very high speed, such as the 5000 one-millisecond segment searches per second mentioned above, it would likely be required that a sequence of commands be issued and that the Doppler corrected matched filter system 10 have an automated method, such as a direct memory access (DMA) capability, of delivering results to the controller 95.

After the controller 95 has read out all of the data required for the particular operation it is performing with the Doppler corrected matched filter system 10, the controller 95 may issue the next command, if necessary. Thus, the Doppler corrected matched filter system 10 may operate asynchronously, as rapidly as the controller 95 may process its output results.

When the invention is used to acquire the signal of a GPS satellite, the objective for the Doppler corrected matched filter system 10 during initial acquisition is to get enough satellites in track to support navigation within one second. Because of the inexpensive frequency standard technology used, this requirement may require searching 10-20 Doppler bins until the first satellite is acquired. In cold start conditions (where some system initialization information is lacking), it may be necessary to search for 2-3 satellites before a visible satellite that is selected. Therefore, it is necessary to be able to search 50 to 100 Doppler bins per second to meet this objective. This search rate is consistent with allowing a current-technology microprocessor to control the Doppler corrected matched filter system 10 one command at a time.

Accordingly, under these assumptions, the command set for the Doppler corrected matched filter system 10 may be relatively simple. The following example commands may be implemented:

X LOAD SIGNAL SAMPLES: At the beginning of the next T20 interval, the Doppler corrected matched filter system 10 would begin loading 20 ms of signal samples.

X INPUT FREQUENCY: A register is required to specify the nominal frequency shift to use while the signal samples are loaded. Assuming reuse of the carrier and code NCO and generation circuits 60, 65 and 70, FIG. 1, this interface may be based on those designs.

X EXECUTE SEARCH: The Doppler corrected matched filter system 10 would immediately execute a correlation search based on the programmed search parameters.

Search parameter registers could be programmed to store the following values:

X Doppler SHIFT: This is a Doppler shift applied to the stored signal as each 1 ms segment is loaded into the signal sample register 250. For example, there may be on the order of 16 or so Doppler values, representing shifts of 750*n Hz, where n=0 though 15.

X PN CODE: This register would likely be used in association with the existing code generator 70. The new function would be to inform the Doppler corrected matched filter system 10 that a new PN code is required, so that the code would be generated and loaded into the code register 235 for use in the next, and subsequent, correlation searches.

Program Implementation

For performance purposes with current technology, the invention is preferably implemented in dedicated circuitry. However, the functions performed by the invention may also be implemented in generalized programmable circuitry capable of generating the following steps:

(1) Receive and store an input sample of a complex signal to be Doppler shift corrected and correlated to a code signal; optionally limit the received complex signal in value range and/or sampling frequency.

(2) Complex mix at least a portion of the stored input sample with a Doppler shift correction value.

(3) Compute the complex products of the mixed portion of the stored input sample with a current code phase of the code signal.

(4) Sum the computed complex products as a current complex integration value.

(5) Compute, such as generating an envelope, (and normally store) the square root of the sum of the squares of the current complex integration value.

(6) Shift the code signal to a next current code phase.

(7) Repeat steps (3) through (6) for the current code phase of the code signal.

(8) Output the code phase and magnitude of the stored computed square root value having the largest magnitude as an indication of correlation between the input sample and the code signal, corrected for Doppler shift.

The following is an example pseudo-code version of one example implementation of a matched filter 15 in accordance with the invention:

```
// Matched Filter Algorithm Pseudo-code
// This version assumes that the samples are loaded with the
// digital IF Fo/8 plus the nominal estimated frequency error
// already removed. The complex spectrum is then centered
// near zero Hz. Further complex frequency shifts will be made
// to search other Doppler bins. The IF has to be removed before
// the sample rate is reduced from 20/Tca to 2/Tca. The analog
// bandwidth is a little too wide for this sampling rate. It has
// to be verified that the PN waveform is as tolerant as expected
// to the resulting aliasing.
// ****** Load the matched filter ********
// This operation is real time, in the sense that the samples are
// being created by a clock that has to sample uniformly in time.
// So, these samples have to be stored as fast as they are received.
// Subsequent processing in the MF can be non-real time (either
// faster or slower).
#define SAMPLES_PER_MS (2046) // Sampling at 2/Tca = 2.046 MHz
#define NUMBER_OF_MS (20)
// The signal samples are complex values (I,Q). Each component,
// in-phase or quadrature, can take on three values: -1, 0, +1. In the
// hardware before the MF, these samples are represented by two bits each
// for I and Q
int s[NUMBER_OF_MS][SAMPLES_PER_MS][2];
int i,j;
for( i = 0 ; i < NUMBER_OF_MS ; i++ )          // each one ms segment
{
    for( j = 0 ; j < SAMPLES_PER_MS ; j++ )     // each complex sample in the ms
    {
        s[i][j][0] = Get_I_Phase_Sample( );   // three-valued, two bit I sample
        s[i][j][1] = Get_Q_Phase_Sample( );   // three-valued, two bit Q sample
    }
}
// ******* Load GPS PN Code ****************
// GPS PN codes could be generated as needed by code generator (re-use
// design from signal processor channels). Alternatively, they could be
// stored in a ROM. Each chip is one bit representing the values -1 and +1.
```

-continued

```
#define CHIPS_IN_CODE (1023)    // periodic length of GPS PN
codes
#define NUMER_OF_CODES (32)    // number of GPS codes
(ignoring pseudolites
                                // and WAAS codes)
int c[NUMER_OF_CODES][CHIPS_IN_CODE];    // Assume ROM
storage notation.
// ******* Load Doppler Signal *************
// The notation here assumes that the complex signals to mix the various
Doppler values
// to dc are stored in a ROM as complex values. That is not a likely
// implementation, but makes the math easier to visualize. The values are
// assumed to be 5 level signals like the normal signal processing channels
// use. Most likely, the generator used in the normal signal processing
// channels could be used as a starting point. Simpler implementations
// using two level quantization (−1,+1) are likely.
#define NUMBER_OF_DopplerS (16)
int d[NUMBER_OF_DopplerS][SAMPLES_PER_MS][2];
for( code = 0 ; code < NUMER_OF_CODES ; code++ )    //
process each code
{
    for( dop = 0 ; dop < NUMBER_OF_DopplerS ; dop++ )    //
process each Doppler shift
    {
        for( seg = 0 ; seg < NUMBER_OF_MS ; seg++ )    // process
each ms
        {
            for( sample = 0 ; sample < SAMPLES_PER_MS ;
sample++ )    // do Doppler shift while loading 1 ms signal register
            {
                s_1ms[sample][RE] = d[dop][sample][RE] *
s[seg][sample][RE] − d[dop][sample][IM] *
                                                s[seg][sample][IM];
                s_1ms[sample][IM] = d[dop][sample][IM] *
s[seg][sample][RE] + d[dop][sample][RE] *
                                                s[seg][sample][IM];
            }
            for( shift = 0; shift < CHIPS_IN_CODE ;
shift++ )    // process each phase shift of the code
            {
half_shift = 2 * shift;
for( half_chip = 0 ; half_chip < 2 ; half_chip++ )    // two
samples per chip
{
// ******* Run the Matched Filter **********
// This version assumes that as each segment is loaded from RAM into a 1
ms long latch
// for correlation with the PN code, the Doppler signal is applied.
int code;        // which pn code is being processed
int sample;      // which sample is being processed
int shift;       // which of the code phases is being processed
int half_shift;// because there are two samples per chip
int seg;         // which one ms signal segment is being processed
int dop;         // which Doppler bin is being processed
int chip;        // which chip is being processed
int r_ms;        // ms accumulator, real part
int i_ms;        // ms accumulator, imaginary part
int sum_20ms[SAMPLES_PER_MS];    // 20 ms non-coherent
accumulators
int s_1ms[SAMPLES_PER_MS][2];    // Current 1 ms of Doppler
shifted signal
#define RE (0)
#define IM (1)
// here we are showing that all codes, Dopplers and phase shifts are
// processed. We may want to be able to select a sub-range, list, or single
// one of these. There are probably some command registers to specify
ranges & modes of operation.
                if(seq == 0)    // zero the 2046 non-coherent
20 ms integrator on first segment
                {
                    sum_20ms[half_shift + half_chip] = 0;
                }
                r_20ms = 0;    // zero the coherent 1 ms
integrators
                i_20ms = 0;
                for( sample = 0 ; sample < SAMPLES_PER_
MS ; sample++ )    // form 1 ms sums
                {
                    chip = (sample + half_chip) / 2;    // stays
```

-continued

```
                    the same for two consecutive samples
                                // The sum can change only by −2, −1, 0, +1,
or +2 at each pass
                                // There is a way to use 5 level (rather than 3
level) Doppler signals and still have only
                                // these change values. This results in less
                                // implementation loss of C/No. The last half
chip of the last sample might just be skipped, if it helps.
    r_ms += c[code][(shift+chip)%CHIPS_IN_CODE] *
( s_1ms[sample][RE] );
                    i_ms += c[code][(shift+chip)%CHIPS_
IN_CODE] * ( s_1ms[sample][IM] );
                }
// The sqrt of the sum of squares (envelope) can be approximated by:
                // max_abs = MAX( |r_ms| , |i_ms| );
                // min_abs = MIN( |r_ms| , |i_ms| );
                // sum_20ms = max_abs + min_abs/2;
sum_20ms[half_shift + half_chip] += sqrt( r_ms *
r_ms + i_ms * i_ms );        // exact value of envelope
} // end of half chip
} // end of code shift
} // end of 1 ms segment
// The 20 ms second sums for this code and Doppler are complete.
//
// Alternatives at this point include
// 1. Interrupt processor to inspect 20 ms sums
//     (a lot of throughput, but might want in case of limited search).
// 2. Hardware search for N largest values and their locations; store for
processor.
// 3. Hardware search for largest value and its location. Store for
processor. May not be adequate.
// 4. Store every value and location above a threshold. Store for
processor.
// 5. Hardware search for largest value. Store value and location for
processor. Interrupt processor and
//     halt the MF until re-enabled by processor. Then continues with
next search.
// Below shows illustration for largest value.
    MaxLoc = −1;
    MaxVal = −1;
for( sample = 0 ; sample < SAMPLES_PER_MS ; sample++ )
    {
        if( sum_20ms[sample] > MaxVal )
        {
            MaxVal = sum_20ms[sample];
            MaxLoc = sample;
        }
    }
// Interrupt processor. Processor has until next start of search to get results.
    // Might want to have a mode that suspends until interrupt is
    // acknowledged. This would be useful if the processor were going to
    // search the 20 ms sums itself or extract some other data.
Interrupt(MF_Complete);
} // end of one Doppler bin
} // end of one pn code choice
MF_Idle( );   // Go to sleep. No clocks, no/low power.
```

The software, which comprises an ordered listing of executable instructions for implementing logical functions, may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium may even be paper punch cards or paper tape or another suitable medium, as the program can be electronically captured, then compiled, interpreted or otherwise processed in a suitable manner if necessary, and then stored in a computer memory.

While the specification in the invention is described in relation to certain implementations or embodiments, many details are set forth for the purpose of illustration. Thus, the foregoing merely illustrates the principles of the invention. For example, this invention may have other specific forms without departing from its spirit or essential characteristics. The described arrangements are illustrated and not restricted. To those skilled in the art the invention is susceptible to additional implementations or embodiments and certain of the details described in this application can be varied considerably, without departing from the basic principles of the invention. It will thus be appreciated that those skilled in the art will be able to devise various arrangements that, although not explicitly described or shown herein, embody the principles of the invention. It is intended that the scope of the invention not be limited by the specification, but be defined by the claims set forth below.

What is claimed is:

1. A system for processing communication data from a code signal input, the system comprising:
    a signal sampler operable to receive signal data;
    a Doppler shift system operable to provide a Doppler shift correction value;
    a storage circuit configured to receive and store the signal data;
    a time domain signal processor comprising a complex mixer, coupled to the storage circuit and Doppler shift system, for mixing at least a portion of the signal data with the Doppler shift correction value, where the complex mixer is corrected for pure frequency shift independently from the signal sampler being corrected for both carrier and code Doppler shift;
    a complex product generation circuit, coupled to the complex mixer and the code signal input, for computing a complex product of the mixed portion of the signal data with a current code phase of a code signal received a the code signal input;
    a summing circuit coupled to the complex product generation circuit for summing the computed complex products as a current complex integration value;
    a square root circuit, coupled to the summing circuit, for computing a square root value of the sum of the squares of the current complex integration values, each square root value having a magnitude and an associated code phase; and
    an output processing circuit coupled to the square root circuit for processing a plurality of computed square root values, where the time domain signal processor is in signal communication with the signal sampler, the Doppler shift system and code signal input, the time domain signal processor operable to shift the signal data by the Doppler shift correction value and to determine a correlation between the shifted signal data and the code signal input where the code phase and the magnitude of the computed square root value having the largest magnitude indicates that correlation between the shifted signal data and the code signal and wherein the time domain processor is a matched filter processor.

2. The system of claim 1 wherein the code signal input is a code division multiple access signal.

3. The system of claim 1 wherein the Doppler shift system further comprises a Doppler shift generator.

4. The system of claim 1 wherein the Doppler shift system further comprises a lookup table with stored precomputed Doppler shift correction values.

5. The system of claim 1 wherein the Doppler shift system is coupled to the time domain signal processor by a data bus.

6. The system of claim 1 wherein the signal sample receives the signal data from a radio frequency receiver.

7. A method for processing communication data comprising:
    receiving signal data;
    applying a Doppler shift correction value to the signal data that includes complex mixing at least a portion of the signal data with the Doppler shift correction value and results in Doppler shifted signal data;
    receiving a code signal; and
    determining a correlation between the Doppler shifted signal data and the code signal in a time domain with a matched filter processor where the correction for pure frequency shift is independent of Doppler shift to both carrier and code, that further includes,
    (a) computing complex products for the mixed portion of the signal data with current code phase of the code signal,
    (b) summing the computed complex products as a current complex integration value,
    (c) computing a square root value of the sum of the squares of the current complex integration value, each square root value having a magnitude and an associated code phase,
    (d) shifting the code signal to a next current code phase,
    (e) repeating (a) through (d) for the current code phase of the code signal, and outputting the code phase and magnitude of the computed square root value having the largest magnitude as an indication of the correlation between the Doppler shifter signal data and the code signal.

8. The method of claim 7 wherein applying a Doppler shift correction value to the signal data comprises
    receiving the Doppler shift correction value.

9. The method of claim 7 wherein applying a Doppler shift correction value to the signal data comprises
    receiving the Doppler shift correction value from a lookup table, and
    complex mixing at least a portion of the signal data with the Doppler shift correction value.

10. A system for processing radio frequency data comprising:
    a signal sample receiver operable to receive signal data;
    a Doppler shift corrector operable to provide a Doppler shift correction value;
    a code signal receiver operable to receive a code signal;
    a processor coupled to the signal sample receiver, the Doppler shift corrector, and the code signal receiver, the processor operable to apply the Doppler shift correction value to the signal data and to determine a correlation between the Doppler shifter signal data and the code signal processor further includes,
    a complex mixer coupled to the signal sample receiver, the complex mixer operable to mix at least a portion of the signal data with a Doppler shift correction value, where the complex mixer is corrected for pure frequency shift independently from the signal sampler receiver being corrected for both carrier and code Doppler shift, a complex product processor coupled to the complex mixer, the complex product processor operable to compute a complex product of the mixed portion of the signal data and a current code phase of a code signal, a summer coupled to the complex product processor, the summer operable to compute the complex products as a current complex value, a square root processor coupled to the summer, the square root processor operable to compute the value of the sum of the squares of the current complex integration value, each square root value having a magnitude and an associate code phase, and a controller operable to determine the code phase and magnitude of the computed square root value having the largest magnitude as an indication of correlation between the Doppler shifted input signal and the code signal; and a signal processor coupled to the signal sample receiver, the signal processor operable to process the signal data to extract encoded data.

11. The system of claim 10 wherein the system is implemented in the computer code operation on a computing processor of a code division multiple access radio receiver.

12. The system of claim 10 wherein the system is implemented in a semiconductor device.

13. The system of claim 10 wherein the system is implemented in an application-specific integrated circuit.

14. The system of claim 10 wherein the processor is a time domains signal processor.

15. The system of claim 10 wherein the processor is a frequency domain signal processor.

16. A system for processing communication data from a code signal input, the system comprising:

means for receiving signal data;

means for providing a Doppler shift correction value; and a time domain signal processor coupled to the receiving means, providing means and the code signal input, the time domain signal processor operable to shift the signal data by the Doppler shift correction value to correct Doppler shift and to determine a correlation between the shifter signal data and the code signal input wherein the time domain signal processor is a matched filter processor where the correction for pure frequency shift is independent from the correction of both carrier and code Doppler shift, and includes, means for storing configured to receive and store the signal data, means for complex mixing coupled to the storing means and providing means for mixing at least a portion of the signal data with the Doppler shift correction value, means for complex product generation, coupled to the complex mixing means and the code signal input, for computing a complex product of the mixed portion of the signal data with a current code phase of the code signal, means for summing, coupled to the complex product generation means, for summing the computed complex products as a current complex integration value, means for generating an envelope, coupled to the summing means, for computing a square root value of the sum of the squares of the current complex integration values, each square root value having a magnitude and an associated code phase, and an output processing circuit, coupled to the generating an envelope means, for processing a plurality of computed square root values, wherein the code phase and magnitude of the computed square root value having the largest magnitude indicates the correlation between the shifted signal data and the code signal.

17. The system of claim 16 wherein the code signal input is a code division multiple access signal.

18. The system of claim 16 wherein the providing means further comprises a Doppler shift generator.

19. The system of claim 16 wherein the providing means further comprises a lookup table with stored precomputed Doppler shift correction values.

20. The system of claim 16 wherein the providing means is coupled to the time domain signal processor by a data bus.

21. The system of claim 16 wherein the receiving means receives the signal data from a radio frequency receiver.

22. A computer readable medium having software for processing communication data, the computer readable medium comprising:

means for receiving signal data;

means for applying a Doppler shift correction value to correct Doppler shift to the signal data that results in a Doppler shifter signal data;

means for determining a correlation between the Doppler shifter signal data and the code signal in time domain where the correction for pure frequency shift is independent from the correction for both carrier and code Doppler shift that includes, means for computing complex products for the mixed portion of the signal data with a current code signal, means for summing the computed complex products as a current complex integration value, means for computing the square root value of the sum of the squares of the current complex integration value, each square root value having a magnitude and an associated code phase, means for shifting the code signal to a next current code phase, and means for outputting the code phase and magnitude of the computed square root value having the largest magnitude as an indication of the correlation between the Doppler shifter signal data and the code signal.

23. The computer readable medium of claim 22 wherein the applying means comprises means for complex mixing at least a portion of the signal data with die Doppler shift correction value.

24. The computer readable medium of claim 22 wherein the applying means comprises means for receiving the Doppler shift correction value over a data bus, and means for complex mixing at least a portion of the signal data with the Doppler shift correction value.

25. The computer readable medium of claim 22 wherein applying means comprises means for receiving the Doppler shift correction value from a lookup table, and means for complex mixing at least a portion of the signal data with the Doppler shift correction value.

26. The computer readable medium of claim 22 wherein the determining means comprises means for processing the Doppler shifted signal data and the code signal with the matched filter routine.

* * * * *